Figure 1:
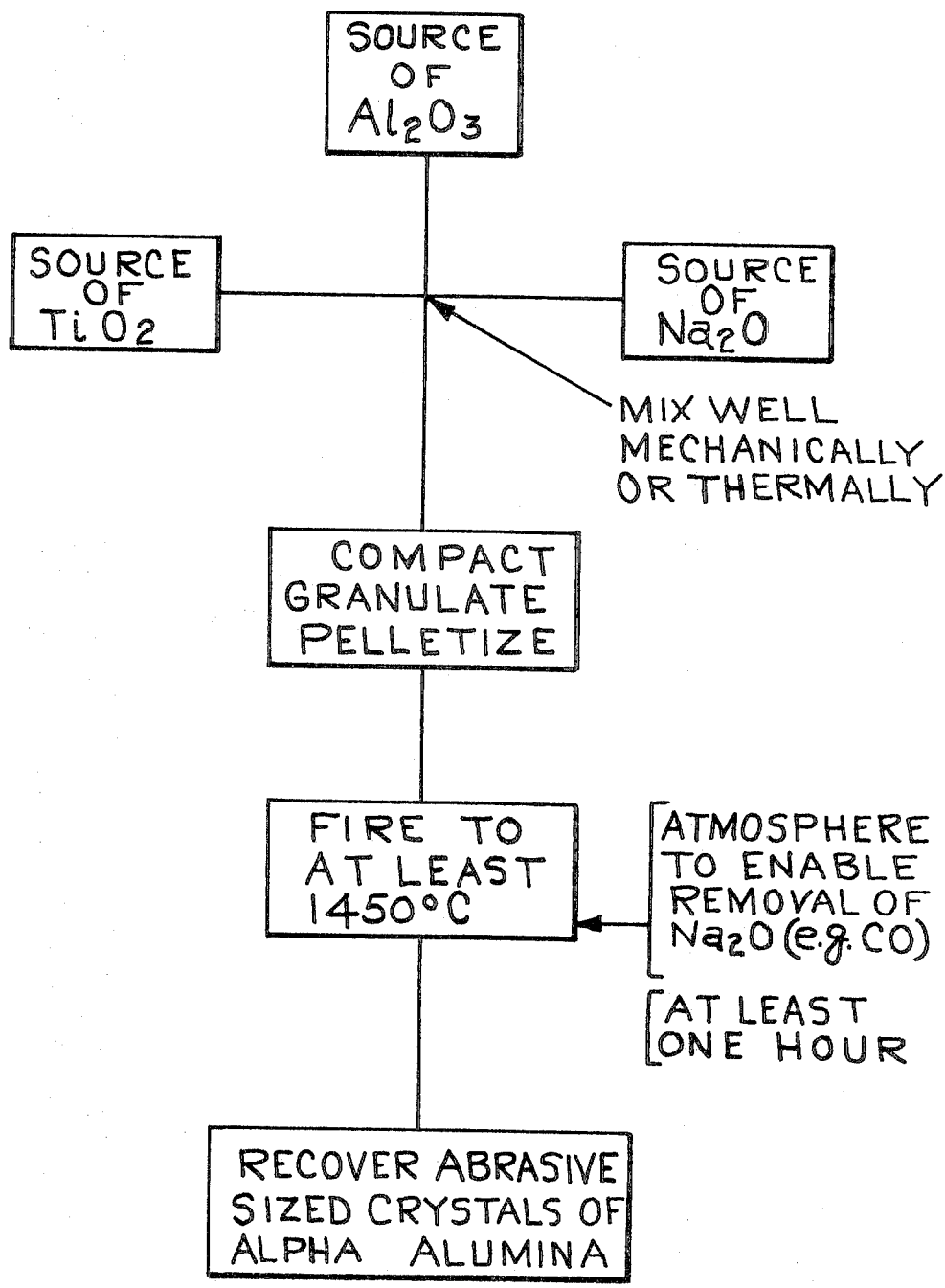

United States Patent

[11] 3,615,306

| [72] | Inventors | Cecil M. Jones, II<br>Worcester;<br>John J. Amero, Shrewsbury, both of Mass. |
|---|---|---|
| [21] | Appl. No. | 674,935 |
| [22] | Filed | Oct. 12, 1976 |
| [45] | Patented | Oct. 26, 1971 |
| [73] | Assignee | Norton Company<br>Worcester, Mass. |

[54] A METHOD FOR PRODUCING ALPHA-ALUMINA CRYSTALS FROM ALUMINUM OXIDE
11 Claims, 3 Drawing Figs.

| [52] | U.S. Cl. | 51/309,<br>51/293, 106/63, 106/65 |
|---|---|---|
| [51] | Int. Cl. | C09c 1/68,<br>B24d 3/02 |
| [50] | Field of Search | 51/307,<br>308, 309, 293; 106/63, 65 |

[56] References Cited
UNITED STATES PATENTS

| 2,360,841 | 10/1944 | Baumann et al. | 51/309.1 |
|---|---|---|---|
| 2,369,709 | 2/1945 | Baumann et al. | 51/309.1 |
| 2,725,286 | 11/1955 | Coes | 51/309 |
| 2,961,296 | 11/1960 | Fenerty | 51/309 |
| 3,079,243 | 2/1963 | Ueltz | 51/309 |
| 1,263,708 | 4/1918 | Saunders et al. | 51/309.1 |
| 1,263,710 | 4/1918 | Saunders et al. | 51/309.1 |
| 3,387,957 | 6/1968 | Howard | 51/309 |

*Primary Examiner*—Donald J. Arnold
*Attorney*—Rufus M. Franklin

ABSTRACT: Abrasive sized crystalline alpha alumina crystals are produced from $Al_2O_3$ containing powder by heating alumina source with source of soda and Titania to 1475° to 1700° C., with crystallization taking place above 1475° C. in presence of atmosphere which is reducing with respect to soda.

3,615,306

A METHOD FOR PRODUCING ALPHA-ALUMINA CRYSTALS FROM ALUMINUM OXIDE

BACKGROUND OF THE INVENTION

This invention relates to the manufacture of crystalline alpha-alumina (corundum) abrasive grain.

In copending application Ser. No. 541,115 of my colleague, John J. Amero, assigned to the same assignee as this application, is described a method of producing alpha-alumina crystals at a temperature below the fusion temperature of alpha alumina, by heating alumina in the presence of a volatile flux such as lead oxide or lead fluoride, to a temperature at which a substantial portion of the flux is volatilized from the system. Alpha-alumina crystals have also been grown by hydrothermal techniques at high pressure and by the heating, for long periods of time, of mineral or prepared sources of aluminum oxide.

All of the above methods of producing alumina crystals by means other than fusion suffer from disadvantages sufficient to prevent them from having superseded the fusion method for producing alpha-alumina crystals for general and precision use as abrasive grain. The prior methods have suffered from such problems as excessive time to produce crystals, excessively high temperatures, and problems of atmospheric pollution and disposal or recovery of excessive amounts of hazardous, corrosive or expensive materials.

The present invention provides a method, employing inexpensive raw materials, which can be employed to produce abrasive sized (e.g., from grit size 8 to grit size 320) alpha-alumina crystals in less time and at lower temperatures than has heretofore been possible.

DESCRIPTION OF THE INVENTION

Summary

A brief description of the manufacturing process for transforming the basic raw materials into the final alpha-alumina crystals is summarized below.

FIG. 1 of the drawing is a flow sheet representing the process in which a source of alumina is mixed with a source of soda and a source of Titania, the powder mixture compacted, and fired so that the mixture is exposed to an atmosphere which enables the removal of $Na_2O$ from the mix for a period of at least 1 hour at a temperature above 1,450° C. After cooling, the product is recovered by chemical or mechanical treatment to free the abrasive crystals from the noncrystalline products.

Figure 2:
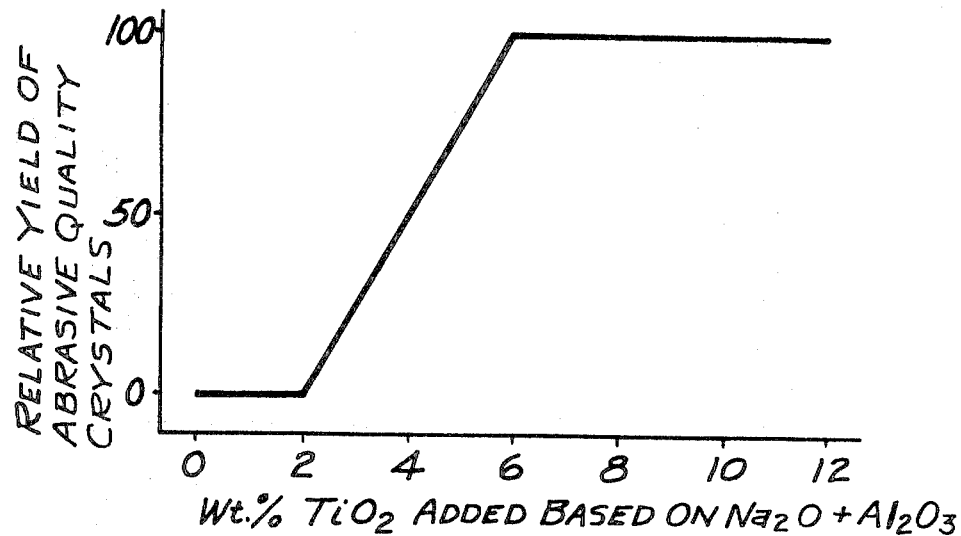

FIG. 2 is a plot showing the effect of Titania, $TiO_2$, in the mix. The vertical axis shows the relative yield of abrasive quality product, for fixed firing conditions versus the weight percent Titania in the mix. As indicated, no significant effect is produced until the level of Titania is higher than 2 percent, based on the weight of soda and alumina. Although not indicated by the plot, increase of Titania above 8 percent makes the product more easily separated from the glassy phase and achieves crystallization under a wider and less critical range of firing conditions.

Figure 3:
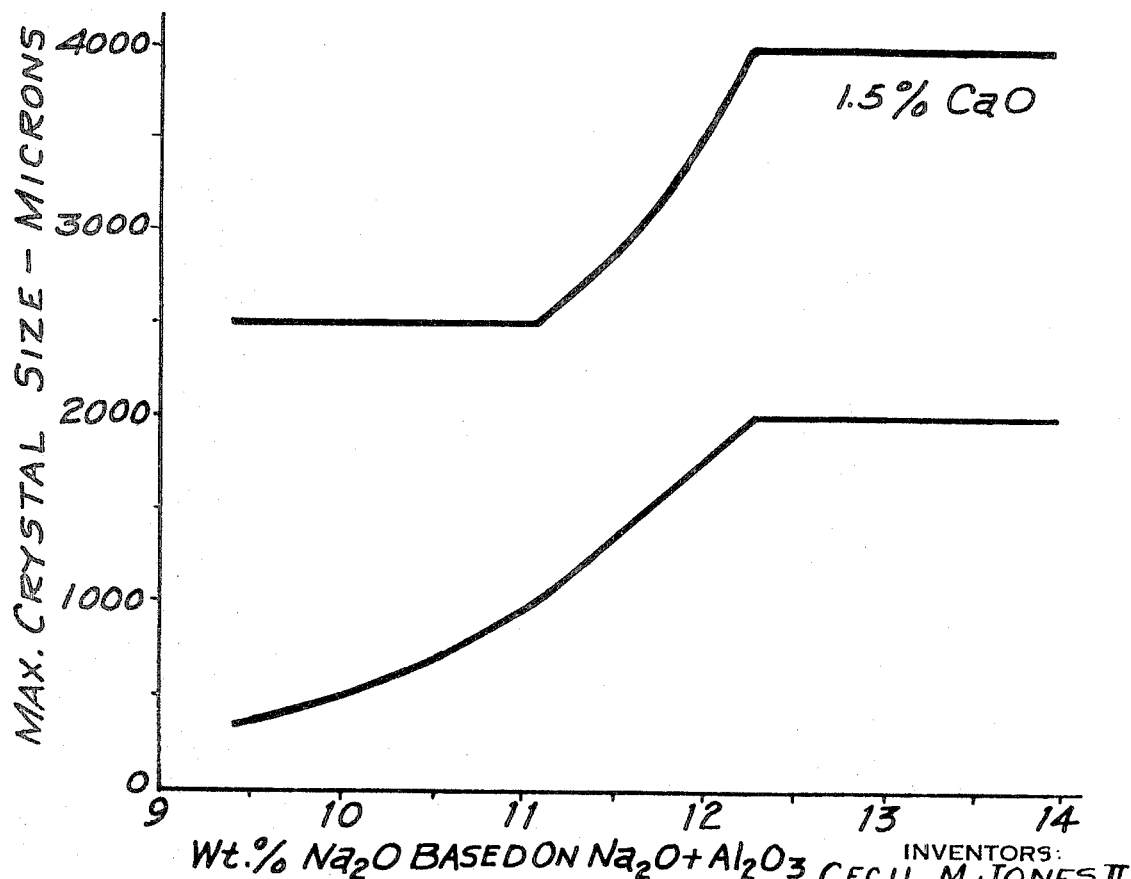

FIG. 3 is a plot showing the effect of the presence of calcium in the reaction mix, and the effect of sodium in the mix. The horizontal axis represents soda content, the vertical axis represents maximum crystal size for a given set of firing conditions, employing a mix containing 10 percent Titania. As shown by the data, the presence of CaO at a level of as little as 1.5 percent doubles (or better) the maximum crystal size for all levels of soda content.

The first step is to mix the various ingredients to a homogeneous mixture so that the necessary reactions can occur. The particles of the individual ingredient should be homogeneously dispersed throughout the mixture and the aluminum oxide source crystals should be less than about 20 microns in order that they can be totally reacted within the time and temperature of the process. This homogeneous mixture can be achieved in two ways. Either by thermal mixing or by mechanical mixing. The mechanical mixing is achieved by placing all of the raw materials into a suitable ball mill or rod mill and thoroughly grinding and mixing the materials so that the aluminum oxide crystals of the source material are less than 20 microns. This is a simple commonly used process in the ceramic industry. Thermal mixing is achieved by first briefly mechanical mixing the aluminum oxide source and the sodium oxide source. This mixture is then placed in a suitable kiln and heated to approximately 1,200° C. for abut 2 hours, which allows all the sodium oxide to react with the aluminum oxide forming both beta alumina (1 sodium oxide to 11 aluminum oxides) and sodium aluminate (1 sodium oxide molecule to 1 aluminum oxide). If thermal mixing is done, it is preferable to do so in an oxidizing atmosphere inasmuch as sodium oxide appears to be less volatile under these conditions.

The material is next formed into small pellets or granules so that the raw ingredients will be in intimate contact necessary for the final reaction to go to completion and will be exposed to the furnace atmosphere. This can be done by two methods. The raw material can be pressed into cakes and then granulated on a screen to the desired size granules, or the material can be mixed with suitable plasticizers and extruded and dried into the proper size granules. The maximum granule size is dictated by the mechanism of the removal of sodium into the vapor phase. In other words, thick granules do not allow the proper elimination of sodium oxide, thus, large alpha crystals would not form. The maximum granule size economically useful is approximately one-fourth inch. The shape of the pressed body is not important so long as at least one dimension is about one-fourth inch or less. When the smallest dimension is greater than this, longer times for conversion are required.

The next step in the process is the firing operation. It also appears that a reasonable and economic firing temperature is about 1,500° C. At temperatures less than this, the reaction is slower. At higher temperatures the reaction can be made to go faster. However, we run into uneconomical kiln design and maintenance problems if the temperature is much above 1,700° C. In the temperature range of 1,500° C. to 1,550° C. this reaction can be made to go to completion, utilizing ¼-inch pellets, in a reasonable time of about 1 hour. Higher temperatures require less time and lower temperatures require more time. The kiln atmosphere surrounding the granules is critical. Very large alpha-alumina crystals to the order of 2 centimeters can be produced by heating the mixture in air at 1,550° C. for 100 hours, but we recognize that a 100 hour soak period would not be economical when producing tonnages of this material and such a process is not part of the present invention. Abrasive quality crystals to the order of 2,000 microns can be produced at 1,500° C. in 1 hour provided the proper reducing atmosphere is used. Tests show that a reducing atmosphere accelerates the formation of the crystals at the expense of a reduction in crystal size; inasmuch as 2 centimeter crystals have low use in the abrasive industry, this reduction in crystal is not a serious detriment. The preferred accelerator of the crystallization process is a reducing atmosphere in the form of carbon monoxide. We theorize, without intending to be bound by our theory, that the carbon monoxide reacts with the sodium oxide to form metallic sodium and carbon dioxide. This metallic sodium has a much higher vapor pressure than does the oxide, thus, the vaporization is accelerated. We have also found that the presence of water vapor in the kiln atmosphere also accelerates the process, probably by converting the sodium oxide to sodium hydroxide which in turn has a higher vapor pressure than the oxide. Whatever the mechanism of the removal of sodium from the reaction mix, it is clear that the operative atmospheres cause sodium to react to form a constituent of high vapor pressure which volatilizes from the mix, thus depleting the sodium content of the mix. Successful crystallization has also been achieved by using hydrogen or methane as a reducing atmosphere. We can also achieve reasonable conversion by subjecting the material to the direct impingement of a methane air flame. Inasmuch as an essential of this process is the removal of sodium oxide, it is important that the thickness of the section through which the sodium oxide must permeate must be kept small, that is, we prefer granules having one dimension not to exceed one-fourth inch in order to achieve full conversion at a reasonable time.

When impure raw materials are used such as bauxite and Ilmenite, the excess impurities such as silica, iron and Titania must be disposed of because they do not enter into the alpha-alumina crystal in any sizable amounts. As this reaction goes to completion, that is, all of the aluminum oxide is essentially formed into single crystals, the remaining matrix mixture would be depleted in aluminum oxide, thus we would expect it to have a very low melting point. We find this is the case and this low melting point glass then must drain into a blotter material. In order to reduce the amount of impurities that must be removed in this process, it is preferable, but not essential to use as pure raw materials as economics will allow. Our blotter materials preferably consist of a mixture of about 80% of aluminum oxide and 20% of a ball clay type material. Pure alumina may be used without any clay admixture.

After the firing cycle has developed large crystals of alpha alumina, the granules may be subjected to a chemical treatment in order to separate the large crystals. First the granules are treated with a strong acid, washed, and then treated with a strong base—e.g. sodium hydroxide. After a thorough washing the matrix material still binding the crystals together becomes soft and easily broken down. The granules are then subject to a mild crushing operation so that the crystals are separated. The excess matrix material is then washed from the crystals which after drying are ready to be incorporated within a grinding wheel. When high purity materials are employed such that a minimal matrix material is contained in the product, the crystals can be recovered by a mild crushing without resort to chemical treatment.

A typical alpha-alumina crystal produced by this process would be 1,000 to 2,000 microns in diameter by 500 to 1,000 microns thick. This size is approximately equivalent to 8 grit as described in abrasive grain sizes Simplified Practice Recommendation 118.50 as published by the U.S. Department of Commerce. The clear crystals have an analysis of 99%+ aluminum oxide and about 0.2% titanium dioxide. In addition, the blue crystals will contain less than 1% iron oxide as the colorant. The crystals without iron oxide are basically transparent sapphire. However, most of them have an internal spherical porosity at about 5 volume percent which gives a milky white appearance to the crystal. The mixture with iron oxide has a similar appearance except for a deep blue color would render the thick sections opaque. Occasionally within the internal porosity we can see trapped matrix which has a composition of approximately 10% sodium oxide and 35% titanium dioxide with the balance being aluminum oxide. In addition to the internal spherical porosity, the shape would be known in abrasive circles as weak shape, with the larger grit sizes tending to be more platy. This abrasive can be identified by, (1) the platy nature of the large crystals, (2) by the fairly spherical internal porosity and (3) by the occasional appearance of trapped matrix within the internal pores. This internal porosity and platy nature of the crystal no doubt contributes to the superiority of this abrasive in precision grinding. In all grinding tests to date, this type of crystal has proven itself to be superior to all known types of commercial precision abrasive grain.

SPECIFIC DETAILS OF THE PROCESS

Raw Materials

The raw materials required are a source of alumina, a source of soda, and a source of Titania.

The alumina may be provided by bauxite, chemically purified bauxite (e.g. Bayer process alumina), sodium aluminate (e.g. beta alumina), or equivalent source of comparable alumina content.

The soda can be provided by any compound of sodium which will retain sodium in the mix under neutral or oxidizing conditions up to the peak firing temperature employed. Sodium carbonate, sodium sulfate, sodium fluoride, cryolite and sodium aluminate have all been satisfactorily employed in this process. Salts with high vapor pressure or which promote loss of sodium prior to the initiation of crystal growth, such as $NaNO_3$ and $NaCl$ are not suitable. The fluorides are less suitable than the oxide, carbonate, or sulfate.

The Titania may be supplied as elemental titanium, $RiO_2$, rutile, $Ti_2O_3$, or as a titanate. Titania, $TiO_2$, has been preferred because of its availability. The titanium content is calculated and expressed herein as the equivalent $TiO_2$, Titania, content.

The relative proportions of alumina (A), soda (N), and Titania (T) in the mix are important. The operative amount of sodium corresponds to a soda content (that is, the sodium in whatever form is calculated as an equivalent amount in terms of sodium content of soda, $Na_2O$) of 6 to 12 weight %. This corresponds to a molecular or mole ratio of alumina to soda (A/N) of from 4 (12 wt. % soda) to 9 (6 wt. % soda). The preferred amount of sodium corresponds to a mole ratio A/N of 5.5 or about 10.5 weight % of soda (all weight %'s in this paragraph being based on alumina plus soda contents, ignoring other ingredients). A serious drop in effectiveness of soda is noted below 8% by weight. Thus the preferred range of soda content is 8 to 12% by weight, or an A/N mole ratio of 4 to 8.

Titania must be present in a mole ratio A/T (alumina to Titania) of from 4 to 20, corresponding to a 4 to 15% by weight content of Titania (based on the Titania and alumina).

Other beneficial additives include lime, $CaO$, which can be added as calcium carbonate, $CaCO_3$. An addition of 1.5% by weight $CaO$ (or the equivalent amount of $CaCO_3$) is effective to produce crystals at least twice as large in the major dimension as are otherwise produced at the same temperature and soak time for a mix not containing calcium or a calcium compound. As little as 0.5 weight % $CaO$ gives a 50% increase in crystal size and no additional benefit is achieved by adding more than 2%. At 3% the maximum crystal size is the same as that achieved at the 1.5% $CaO$ level.

Although it is desirable to keep unnecessary nonaluminous materials to a minimum to minimize unwanted byproducts which tend to make recovery of the crystals less economical, impurities at the level found in bauxite are tolerable. Silica, although tolerable in the amounts found in bauxite is undesirable. Magnesia or magnesium compounds are inhibiting to crystallization, as is chromium and, to some extent, iron. Iron, however, is effective in conjunction with Titania, to produce a blue color in the crystalline product which may be desirable for certain applications.

Pelletization of the mix may be accomplished by very light pressure. Any pressure sufficient to produce reasonably self-sustaining shapes is sufficient. Higher pressures are not necessary, but may be employed without detriment. A pressure of over 50 p.s.i. is desirable.

Inert materials may be mixed in or with the pellets. For example, carbon in the form of charcoal or coke may be employed to keep pellets separated, as in a gravity fed vertical shaft furnace, a rotary kiln, or a fluidized bed furnace.

Furnacing Conditions

The variables in the furnacing are the time, temperature, and furnace atmosphere. The lowest temperature at which good results have been achieved in a reasonable time is 1,450° F. It is preferred to operate at 1,500° C. to 1,550° C., although higher temperatures may be employed.

The furnace atmosphere should provide reducing conditions with respect to $Na_2O$. Carbon monoxide, either pure or in admixture with nitrogen or other nonoxidizing gases is operative in the process as is hydrogen or methane, which cracks to provide hydrogen at the temperature involved. The concentration and flow rate of the atmosphere must be sufficient to effect quantitative removal of sodium from the reactant mixture in the chosen soak time, which may vary from 1 to 6 hours. Longer soak times may of course be used, but seriously detract from the economics of the process. Crystallization of alpha alumina does not begin until the soda has been reduced below an A/N ratio of 11.

One method of producing operative reducing conditions is to fire the pellets adjacent the tip of the flame of a gas fired furnace with the air-gas ratio adjusted to produce reducing conditions. A typical mix is a stoichiometric mixture of natural gas and air. Oxygen deficient mixes also, of course, are reducing. For typical natural gas the stoichiometric ratio is 10 volumes of air to 1 volume of gas.

For purposes of illustration and testing a horizontal tube furnace with a controlled atmosphere has been employed. The furnace is heated by resistance heating elements spaced around the outside and parallel to the axis of the tube and various gases and gas mixtures are fed through the tube during a run. The tube has a cross section of 7.07 sq. inches (46 sq. centimeters). A typical charge of mix consists of 25 grams. The heat-up time has not been found critical, and after reaction, the contents may be discharged immediately. Thus, the cooling time has no critical influence of the process.

Illustrative Examples

The following are examples of mixtures of various raw materials which have been successfully employed to produce abrasive sized alpha-alumina crystals according to the present invention:

found to be several times more active as $CO$, and $CH_4$ even more active under the conditions specified. The concentration and flow of reducing gas must be sufficient to remove most of the soda from the mix in 1 to 5 hours at the soak temperature employed. As soon as the soda is reduced to below 5.5% by weight (N/A=11.1) growth of alpha-alumina crystals begins. Thus for reasonable conversion, we can specify that at least 95% of the original soda must have been removed from the mix. Stated another way, for optimum mixes, the soda content should have been reduced to 0.5% or less at the end of the firing.

The product, upon removal from the furnace is treated with hot 0.1 normal sulfuric acid for 1 hour or more, and then with 20% NaOH for 1 hour. With mixes such as 1508-1, which contain small amounts of impurities, the crystals may be separated mechanically, as by crushing, or with chemical treatment. The chemical treatment is employed to remove excess slag (noncrystalline phase) and any mechanical or chemical treatment to accomplish this end may be employed.

Grinding Performance

A mixture of B-7, 90 parts, and Titania, 10 parts, was pelletized into 16 mesh and coarser granules and fired in a gas kiln, the gas to air ratio by volume being 1 to 10, with the flame impinging directly on the granules set on an alumina batt, one layer deep. The pellets upon removal after a 5 hour firing time at 1,550° C. showed excellent crystal development.

TABLE I

| Mix identification | $Al_2O_3$ source | $Na_2O$ source | $TiO_2$ source | Other additives |
|---|---|---|---|---|
| 1508-1 | B-7, 90% | (B-7) | $TiO_2$, 10% | |
| 1508-2 | B-7, 87% | (B-7) | $TiO_2$, 10% | $Fe_2O_3$, 3%. |
| 1508-3 | B-7, 87% | (B-7) | $TiO_2$, 10% | $CaCO_3$, 3%. |
| 1525 | Bayer alumina (A-2), 80% | $Na_2CO_3$, 17% | $TiO_2$, 10% | |
| 1564-1 | Bayer alumina (A-2), 81% | $Na_2CO_3$, 16% | $TiO_2$, 10% | |
| 1564-2 | Bayer alumina (A-2), 78% | $Na_2CO_3$, 16% | $TiO_2$, 10% | $Fe_2O_3$, 3%, $CaCO_3$, 3%. |
| 1570 | Bayer alumina (A-2), 78% | $Na_2CO_3$, 16% | $TiO_2$, 10% | $Cr_2O_3$, 3%, $CaCO_3$, 3%. |
| D-20-1 | B-7, 79% | (B-7) | $FeTiO_3$, 4% | |
| D-20-2 | B-7, 79% | (B-7) | $FeTiO_3$, 6% | |
| D-20-3 | B-7, 79% | (B-7) | $FeTiO_3$, 8% | |
| D-20-5 | B-7, 79% | (B-7) | $FeTiO_3$, 12% | |
| D-21 | B-7, 79% | (B-7) | $TiO_2$, 6% | |
| D-20-6 | B-7, 79% | (B-7) | $Ti_2O_3$, 6% | |
| D-26-1 | B-7, 79 parts | (B-7) | $TiO_2$, 9 parts | $Cr_2O_3$, 3 parts. |
| D-26-2 | B-7, 79 parts | (B-7) | $TiO_2$, 9 parts | $V_2O_5$, 3 parts. |
| D-26-3 | B-7, 79 parts | (B-7) | $TiO_2$, 9 parts | CaO, 3 parts. |
| D-26-4 | B-7, 79 parts | (B-7) | $TiO_2$, 9 parts | MnO, 3 parts. |
| D-26-5 | B-7, 79 parts | (B-7) | $TiO_2$, 9 parts | NiO, 3 parts. |
| D-73 | B-7, 89% | (B-7) | Ti, 6% | |
| 52-F | Surinam bauxite, 79% | $Na_2SO_4$, 19% | $TiO_2$, 2% | Typical impurities of bauxite (calcined). |
| 53-N | Surinam bauxite, 82% | $Na_2CO_3$, 16% | $TiO_2$, 2% | |
| 65-E(M) | Bayer alumina, 70 parts | NaF, 9 parts | $TiO_2$, 8 parts | |
| 43-S | Surinam bauxite, 50% | $Na_3AlF_6$, 25% | Ilmenite, 25% | |
| T-1 | Bayer alumina, 78% | $Na_2O$, 12% | $TiO_2$, 10% | |
| T-2 | B-7, 87% | (B-7) | $TiO_2$, 10% | $CaCO_3$, 3%. |
| T-3 | B-7, 83% | (B-7) | $TiO_2$, 10% | $CaCO_3$, 6%. |
| T-4 | $Al_2O_3$, 86% | $Na_2TiO_3$, 14%* | ($Na_2TiO_3$) | |

*A Mixture of $Na_2O$ and $Na_2Ti_3O_7$ in the mole ratio of 2 to 1.

In the above table, B-7 designates an alumina-soda composition consisting of 82% Bayer process alumina (A-2 alumina from Aluminum Company of America) and 18% sodium carbonate mixed and fired for 2 hours at 1,400° C. The product is essentially beta alumina ($Na_2O\cdot11\ Al_2O_3$) and sodium aluminate (1:1). The analysis of the B-7 is 9.5% $Na_2O$ and 90% $Al_2O_3$. Sodium sulfate may be used in place of the sodium carbonate to produce B-7. Before use the material is milled to reduce the particle size to 20 microns or less.

The above mixes all give good quantitative production of alpha-alumina crystals within 1-6 hours in an atmosphere of $CO$ or nitrogen and $CO$. Typical furnacing conditions for the tube described above are 200 cc. per minute of $CO$ mixed with 3 liters of nitrogen which is preferably wet by passing through water prior to injection into the furnace. The mix, in the form of granules or pellets, less than one-fourth inch in size are spread in a thin layer on a batt (such as alumina) and held at from 1,450° to 1,700° C. for from 1 to 6 hours, the higher temperatures requiring less time. Hydrogen or methane may be substituted for $CO$, but lower flow rates should be employed to prevent overreduction of the mix or even reduction of the structural materials of the furnace itself. Hydrogen has been After cooling the crystals were separated by acid-alkali treatment as previously described and the separated crystals were screened. Useful yield in the range of from 12 to 100 grit was obtained.

Abrasive grain such as produced above was made into grinding wheels in 46 grit and 60 grit sizes using a standard vitrified bond. The wheels were 7½ inches in diameter and ½-inch thick and conformed to the standard Norton Company specification J (grade) 8 (structure). In grinding a typical steel under standardized conditions the product outperformed a commercial high purity fused aluminum oxide abrasive. The ratio of volume of metal removed per volume of wheel wear was from 22 to 36% higher for the abrasive of this invention.

The shape of the abrasive of this invention is particularly suitable for the manufacture of coated abrasives. In a comparison of resin bonded coated abrasive fiber discs, using standard 30 grit abrasive and 30 grit abrasive of this invention, the percent cut of 1020 steel was 28% higher for the abrasive grain of the present invention.

What is claimed is:

1. A method for producing abrasive sized alpha-alumina crystals from oxide comprising:

1. providing a reaction mix which is a composition including an alumina containing material, a Titania containing material and a material which contains soda or generates soda upon heating, the mole ratio of alumina to soda being between 4 and 9 and the mole ratio of alumina to Titania being between 4 and 20; said soda containing material having a volatility under neutral or oxidizing conditions less than that of NaCl;
2. heating said composition within a temperature range from about 1,450° C. to the melting temperature of alpha-alumina;
3. holding said composition at a temperature within said temperature range for from 1 to 6 hours under conditions whereby more than 95% of the soda content is removed from the reaction mix in from 1 to 6 hours;
4. cooling the reaction mix and separating abrasive sized alpha-alumina crystals therefrom.

2. A process as defined in claim 1 in which the reaction mix is pressed into pellets prior to heating.

3. A process as defined in claim 1 in which said alumina containing material has a particle size of 20 microns or less.

4. A process as defined in claim 1 in which the reaction mix is subjected to an atmosphere which reacts with sodium oxide to produce a reaction product, including sodium, which has a vapor pressure higher than sodium oxide.

5. A process as defined in claim 1 in which the reaction mix is subjected to an atmosphere which is reducing with respect to sodium oxide.

6. A process as defined in claim 1 in which the reaction mix is exposed to an atmosphere which includes carbon monoxide.

7. A process as defined in claim 1 in which the reaction mix is exposed to an atmosphere which includes hydrogen.

8. A process as defined in claim 1 in which methane is injected into the atmosphere surrounding the reaction mix.

9. A process as in claim 1 in which the said soda containing or generating material is selected from the group consisting of sodium carbonate and sodium sulfate.

10. A process as in claim 1 in which the said alumina containing material consists of beta-alumina.

11. A process as in claim 1 in which said Titania containing material consisting of titanium dioxide.

* * * * *